(12) United States Patent
Nishikawa et al.

(10) Patent No.: US 10,718,434 B2
(45) Date of Patent: Jul. 21, 2020

(54) STEP SEAL, SEAL STRUCTURE, TURBO MACHINE, AND METHOD FOR MANUFACTURING STEP SEAL

(71) Applicant: MITSUBISHI HITACHI POWER SYSTEMS, LTD., Yokohama-shi, Kanagawa (JP)

(72) Inventors: Toyoharu Nishikawa, Tokyo (JP);
Yoshihiro Kuwamura, Tokyo (JP);
Hiroharu Oyama, Yokohama (JP);
Katsuhisa Hamada, Yokohama (JP);
Hideaki Sugishita, Tokyo (JP)

(73) Assignee: MITSUBISHI HITACHI POWER SYSTEMS, LTD., Yokohama-shi, Kanagawa (JP)

( * ) Notice: Subject to any disclaimer, the term of this patent is extended or adjusted under 35 U.S.C. 154(b) by 120 days.

(21) Appl. No.: 15/780,752

(22) PCT Filed: Nov. 29, 2016

(86) PCT No.: PCT/JP2016/085351
§ 371 (c)(1),
(2) Date: Jun. 1, 2018

(87) PCT Pub. No.: WO2017/098960
PCT Pub. Date: Jun. 15, 2017

(65) Prior Publication Data
US 2018/0355979 A1    Dec. 13, 2018

(30) Foreign Application Priority Data

Dec. 9, 2015 (JP) ................................ 2015-240488

(51) Int. Cl.
*F16J 15/447*    (2006.01)
*F01D 11/08*    (2006.01)
(Continued)

(52) U.S. Cl.
CPC ............... *F16J 15/447* (2013.01); *B24B 9/00* (2013.01); *B24B 19/14* (2013.01); *F01D 5/225* (2013.01);
(Continued)

(58) Field of Classification Search
CPC ........ F16J 15/447; F16J 15/4472; B24B 9/00; B24B 19/14; F01D 5/225; F01D 11/025;
(Continued)

(56) References Cited

U.S. PATENT DOCUMENTS 5,029,876 A    7/1991   Orlando et al.
7,445,213 B1   11/2008  Pelfrey
(Continued)

FOREIGN PATENT DOCUMENTS

JP    H2-245581 A    10/1990
JP    2008-196522 A   8/2008
(Continued)

OTHER PUBLICATIONS

International Search Report dated Feb. 14, 2017, issued in counterpart application No. PCT/JP2016/085351. (2 pages).
(Continued)

*Primary Examiner* — Gilbert Y Lee
(74) *Attorney, Agent, or Firm* — Westerman, Hattori, Daniels & Adrian, LLP (57) ABSTRACT

There are provided a step seal, a seal structure, a turbo machine, and a method for manufacturing a step seal. The step seal suppresses leak of a fluid from a gap between a first structure and a second structure and is formed on the first structure so as to have a clearance between the step seal and a seal fin formed on the second structure. The first structure and the second structure face each other in a radius direction with the gap inbetween and rotate around an axis line relative to each other. The step seal includes: a step seal body
(Continued)

having a step face facing an upstream side of a flow direction of the fluid and an opposed face facing the second structure; and a protrusion formed between the step face and the opposed face.

18 Claims, 7 Drawing Sheets

(51) Int. Cl.
*B24B 9/00* (2006.01)
*F01D 11/02* (2006.01)
*B24B 19/14* (2006.01)
*F01D 5/22* (2006.01)

(52) U.S. Cl.
CPC ............ *F01D 11/025* (2013.01); *F01D 11/08* (2013.01); *F16J 15/4472* (2013.01); *F05D 2220/31* (2013.01); *F05D 2230/10* (2013.01); *F05D 2240/11* (2013.01); *F05D 2240/55* (2013.01); *F05D 2250/232* (2013.01); *F05D 2250/314* (2013.01)

(58) Field of Classification Search
CPC .. F01D 11/00; F05D 2220/31; F05D 2230/10; F05D 2240/11; F05D 2240/55; F05D 2250/232; F05D 2250/314
See application file for complete search history.

(56) References Cited

U.S. PATENT DOCUMENTS

| | | |
|---|---|---|
| 2008/0124215 A1 | 5/2008 | Paolillo et al. |
| 2012/0091662 A1* | 4/2012 | Neeli ...................... F01D 11/02 277/420 |
| 2012/0121393 A1 | 5/2012 | Kuwamura et al. |
| 2013/0129493 A1 | 5/2013 | Matsumoto et al. |
| 2013/0149118 A1 | 6/2013 | Lotfi et al. |
| 2015/0260042 A1 | 9/2015 | Nishijima et al. |
| 2016/0333714 A1 | 11/2016 | Matsumoto et al. |

FOREIGN PATENT DOCUMENTS

| | | |
|---|---|---|
| JP | 2011-80452 A | 4/2011 |
| JP | 2012-72689 A | 4/2012 |
| JP | 5693529 B2 | 4/2015 |
| JP | 2015-169077 A | 9/2015 |
| WO | 2014/010052 A1 | 1/2014 |

OTHER PUBLICATIONS

International Preliminary Report on Patentability (Form PCT/IB/373) issued in counterpart International application No. PCT/JP2016/085351 dated Jun. 12, 2018, with Form PCT/ISA/237. (7 pages).
Office Action dated Jun. 6, 2017, issued in counterpart Japanese application No. 2015-240488, with English translation. (7 pages).
Office action dated Jun. 19, 2019, issued in counterpart KR application No. 10-2018-7015323, with English translation. (8 pages).
Office Action dated Sep. 4, 2019, issued in counterpart CN application No. 201680070955.1, with English translation. (13 pages).

* cited by examiner

FIG. 8 ions filed in the United States Patent and Trademark Office, the disclosures of which are incorporated by reference herein in their entirety.

STEP SEAL, SEAL STRUCTURE, TURBO MACHINE, AND METHOD FOR MANUFACTURING STEP SEAL

TECHNICAL FIELD

The present invention relates to a step seal that suppresses fluid leak from a space between two structures, a seal structure, a turbo machine using the seal structure, and a method for manufacturing a step seal.

BACKGROUND

In a turbo machine such as a steam turbine, a gas turbine, or a turbo compressor, possible leak of an operation fluid such as steam from a gap between a stationary side and a rotating side causes a loss (leak loss) of the efficiency in the turbo machine. With the foregoing problem in view, a turbo machine uses a non-contact seal structure such as a labyrinth seal to avoid leak of an operation fluid.

A known labyrinth seal is of a step type, which includes: a seal member such as a seal fin being arranged in an inner circumference of a casing, which serves as an outer shell of the turbo machine, and extending toward a rotating vane; and a step-form shroud formed on the tip of the rotating vane (e.g., Patent Literature 1).

In such a step-type labyrinth seal, a radius-direction wall along the radius direction of the step section (step seal) of the shroud forms a main vortex of the operation fluid, and the action of a corner of the step section generates a separated vortex (vortex of the separated flow) from the main vortex at the upstream side of the seal fin. This separation vortex provides so-called contraction effect, so that the amount of leak of the operation fluid from the clearance between the seal fin and the shroud can be reduced.

PRIOR ART REFERENCE

Patent Literature

Patent Literature 1: Japanese Laid Open Patent Publication No. 2012-072689

SUMMARY

Problems to be Solved by Invention

Unfortunately, a typical step-type labyrinth seal such as the one disclosed in Patent Literature 1 does not have satisfactory leak-suppressing effect and leak loss suppressing effect of the turbo machine. This is because the radius-direction wall, which forms the corner of the step seal and which faces the upstream side, is straightly extending in the radius direction and does not therefore have a sufficient shape for proactively generating the main vortex in the operation fluid (i.e., for swirling the operation fluid).

In cases where an adequate height of the step seal cannot be ensured due to layout restriction and/or the distance between the seal fin and the step seal deviates from the designed point due to possible stretch of the shroud in the axis direction (i.e., the direction of the rotating shaft of the turbo machine) by heat, the above shape largely and particularly affect the growth of the main vortex. Accordingly, the main vortex does not grow sufficiently.

This may result in insufficient separation from the main vortex at the corner of the step section, so that the separation vortex does not sometimes grow sufficiently, and consequently, an expected contraction flow effect cannot be obtained. This sometimes fails to ensure satisfactory leak-suppressing effect and leak loss suppressing effect of the turbo machine.

With the foregoing problems in view, the object of the present invention is to provide a step seal, a seal structure, a turbo machine, and a method for manufacturing a step seal that can stably obtain high leak-suppressing effect and that can stably reduce the leak loss of a turbo machine.

Means to Solve the Problem (1) To attain the above object, the step seal of the present invention suppresses leak of a fluid from a gap between a first structure and a second structure and that is formed on the first structure so as to have a clearance between the step seal and a seal fin formed on the second structure, the first structure and the second structure facing each other in a radius direction with the gap inbetween and rotating around an axis line relative to each other. The step seal includes: a step seal body including a step face facing an upstream side of a flow direction of the fluid and an opposed face facing the second structure; and a protrusion formed between the step face and the opposed face.

(2) The protrusion is preferably a sharp protrusion having a sharp tip.

(3) The length of the protrusion along the axis line is preferably at most 1.5 times a length of the seal fin along the axis line, an angle of the protrusion is preferably 75 degrees or less, and a tilt angle of the protrusion is preferably set in a range of −30 degrees or more and 150 degrees or less.

(4) The protrusion preferably protrudes toward the second structure.

(5) The protrusion preferably protrudes toward the upstream side.

(6) A length of the protrusion along the axis line is preferably at least 0.1 times and at most 0.5 times a length of the seal fin along the axis line.

(7) To attain the above object, the seal structure of the present invention suppresses leak of a fluid from a gap between a first structure and a second structure facing each other in a radius direction with the gap inbetween and rotating around an axis line relative to each other, the seal structure including: a step seal defined in one of above (1)-(6), the step seal being formed on the first structure; and a seal fin that extends toward the opposed face of the step seal at a downstream side of the flow direction of the fluid with respect to the step face of the step seal and that is formed on the second structure so as to have a clearance between the seal fin and the opposed face.

(8) To attain the above object, the turbo machine of the present invention includes the seal structure defined in above (7).

(9) To attain the above object, the method for manufacturing a step seal in a step structure that suppresses leak of a fluid from a gap between a first structure and a second structure, the step seal being formed on the first structure so as to have a clearance between the step seal and a seal fin formed on the second structure, the first structure and the second structure facing each other with the gap inbetween and rotating around an axis line relative to each other, the method including: a cutting step of setting, in a step seal raw material including a first face and a second face crossing the first face, a predetermined range from a surface of one of the first face and the second face in a thickness direction to be a prospective cut portion and by cutting the prospective cut portion in a cutting direction that crosses the thickness direction, forming a protrusion protruding toward the cutting direction.

(10) The method preferably further includes a grinding step of grinding the protrusion into a sharp protrusion.

Effect of Invention

According to the present invention, the protrusion formed on the step seal can deviate, at the upstream side of the seal fin, the flow of fluid directing to a clearance between the step seal and the seal fin from the clearance. Consequently, the fluid directing to the clearance can be proactively weakened and the growth of a separated vortex at the upstream side of the clearance (i.e., the enhancement in the contraction flow effect) can be proactively encouraged. This can stably obtain leak-suppressing effect due to the seal structure and reduction effect on leak loss of the turbo machine.

Since the protrusion can be formed using the flush generated in the course of the cutting, the protrusion can easily be formed at low cost. Consequently, it is possible to inhibit a rise of the production cost for forming the protrusion.

BRIEF DESCRIPTION OF DRAWING

FIGS. 4A and 4B are schematic sectional views for describing an effect of the step seal of the first embodiment.

FIGS. 6A, 6B, and 6C are schematic sectional views describing a method of manufacturing the step seal according to the first embodiment.

FIGS. 9A, 9B, and 9C are schematic sectional views describing a method of manufacturing the step seal according to the second embodiment.

EMBODIMENTS TO CARRY OUT INVENTION

Hereinafter, description will now be made in relation to embodiments of the present invention with reference to the accompanying drawings.

In the present embodiment, description will now be made in relation to an example that applies the step seal, the seal structure, the turbo machine, and the method for manufacturing a step seal of the present invention to a steam turbine.

The following embodiments are exemplary and do not intend to exclude various modification and application of technique not explicitly described in the following embodiments. The structures of the embodiments can be modified without departing from the scope of the embodiment, can be selected and omitted if required, and can be appropriately combined.

In the following description, the terms "upstream" and "downstream" respectively mean the upstream and downstream with respect to the flow of steam S in a steam turbine unless otherwise specified. In other words, the left side in FIGS. 1-4B, and 6A-9C is regarded as the upstream side and the right side in the same drawings is regarded as the downstream side.

In the description, the direction toward the axis line CL of the steam turbine is regarded as the inner circumference side or inside, and the opposite side, the direction departing from the axis line CL is regarded as the outer circumference side or outside.

1. First Embodiment 1-1. Overall Configuration of Steam Turbine

Figure 1:
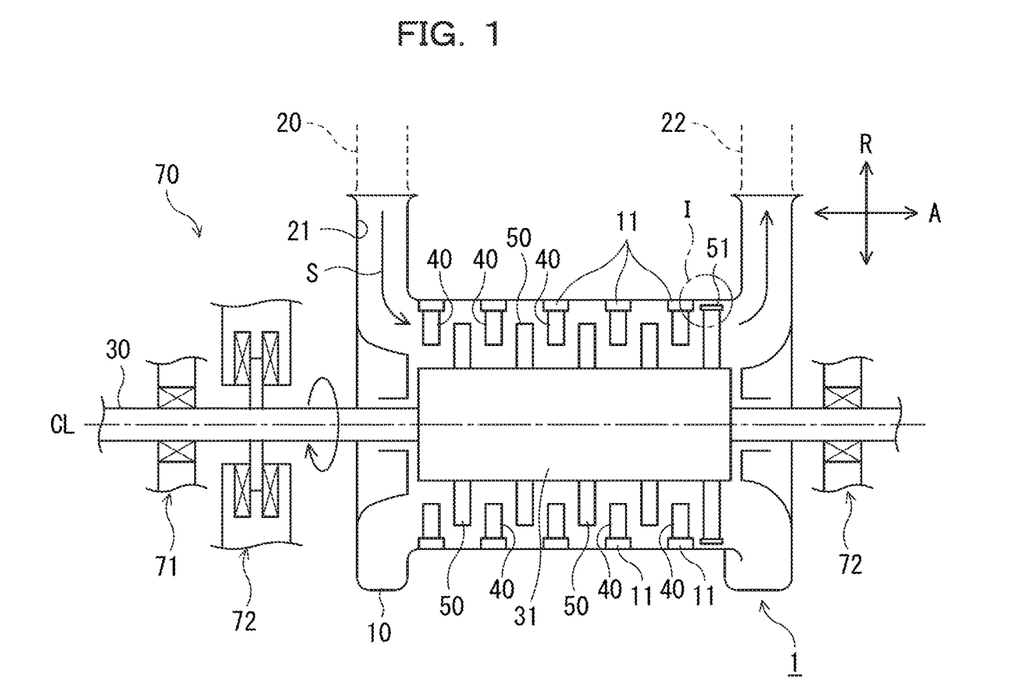
FIG. 1 is a schematic longitudinal sectional view illustrating the entire structure of a steam turbine according to embodiments of the present invention.

As illustrated in FIG. 1, the steam turbine 1 (turbo machine) of the present embodiment is formed of a casing (second structure) 10, a rotating shaft 30 that is rotatably provided inside the casing 10 and that transmits power to a non-illustrated machine such as a generator, stationary vanes 40 provided to the casing 10, rotating vanes 50 provided to the rotating shaft 30, and a bearing 70 that supports the rotating shaft 30 so as to allow the rotating shaft 30 to rotate around the axis line CL. The stationary vanes 40 and the rotating vanes 50 are blades extending in the radius direction R of the rotating shaft 30.

The casing 10 is immobile while the rotating vanes 50 rotate around the axis line CL. This means that the casing 10 and the rotating vanes 50 (including a shroud 51 to be detailed below) rotate relative to each other.

The steam (fluid) S is introduced from a main inlet 21 formed on the casing 10 via a steam supplying pipe 20 connected to a non-illustrated steam providing source and is exhausted from a steam exhausting pipe 22 connected to the downstream side of the steam turbine.

The inner space of the casing 10 is airtightly sealed and serves as the flow path of the steam S. On the inner wall of the casing 10, partition-plate outer rings 11 each in a form of a ring through which the rotating shaft 30 is placed are rigidly fixed.

The bearing 70 includes a journal bearing device 71 and thrust bearing devices 72 and rotatably supports the rotating shaft 30.

A large number of stationary vanes 40 each extend toward the inner circumference from the casing 10, are radially arranged around the rotating shaft 30 to constitute a circular stationary vane group, and are each retained by the partition-plate outer ring 11 described above.

Multiple circular stationary vane groups each including multiple stationary vanes 40 are arranged along the axis direction A of the rotating shaft 30 (hereinafter, simply referred to as the axis direction) at intervals. Each circular stationary vane group converts the pressure energy of the steam S into the velocity energy and lets the steam S having increased velocity energy flow into the rotating vanes 50 adjacent to the circular stationary vane group on the downstream side.

The rotating vanes 50 are rigidly installed on the outer circumference of the shaft main body 31 of the rotating shaft 30. A large number of rotating vanes 50 are radially arranged downstream of each circular stationary vane group to constitute a circular rotating vane group.

A pair of a circular stationary vane group and a circular rotating vane group is regarded as a single stage. In the rotating vane group of the last stage, the tips of the rotating vanes 50 neighboring in the circumference direction of the rotating shaft 30 (hereinafter, simply referred to as the circumference direction) are coupled to each other by a ring-form shroud (first structure) 51. Alternatively, the shroud 51 may be applied to another rotating group(s) and/or a stationary vane group(s) in addition to the rotatable vane group of the last stage.

1-2. Seal Structure 1-2-1. Overall Configuration of the Seal Structure

Figure 2:
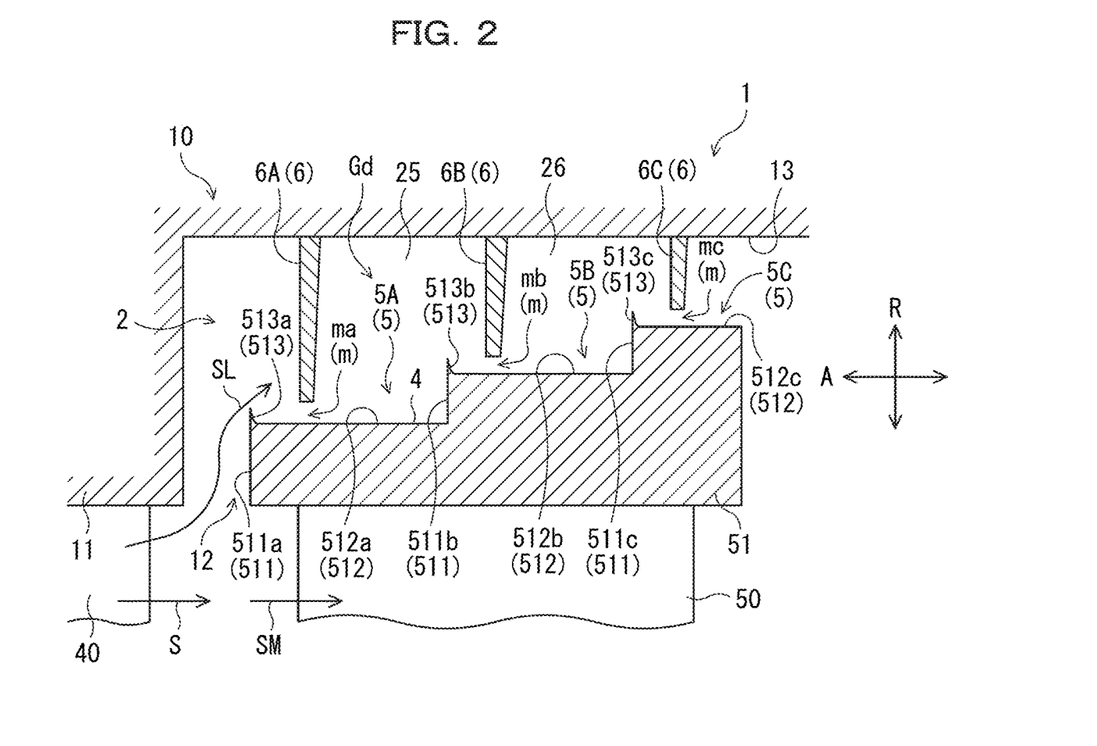
FIG. 2 is a sectional view of a main part of a steam turbine according to a first embodiment of the present invention, specifically an enlarged sectional view of the part I of FIG. 1.

As illustrated in FIG. 2, at the downstream side of the partition-plate outer ring 11 in the axis direction, a groove (hereinafter, an annular groove) 12 in the form of a circular ring is formed, which has a radius widened from the partition-plate outer ring 11 and the base face 13 (hereinafter also referred to as a casing base face) in the inner circumference face of the casing 10. The annular groove 12 accommodates the shroud 51 and the casing base face 13 is opposed to the shroud 51 via a gap Gd in the radius direction R.

Steam MS composing the most part of the steam A flows into the rotating vanes 50 and the energy of the steam MS is converted into rotational energy, which consequently rotates the rotating shaft 30. In contrast, steam (hereinafter leak steam) SL composing part (e.g., several percent) of the steam S does not flow into the rotating vanes 50 and leaks into the annular groove 12. Since the energy that the leak steam SL possess is not converted into the rotational energy, the leak steam SL may cause leak loss that degrades the efficiency of the steam turbine 1.

Considering the above, a seal structure (step-type labyrinth seal) 2 according to the first embodiment is provided at the gap Gd between the casing 10 and the rotating vanes 50. Hereinafter, description will now be made in relation to the seal structure 2.

As illustrated in FIG. 2, the ring-shape shroud 51 is arranged on the tips of the rotating vanes 50 as described above. The shroud 51 has a step-shaped cross section (shape of a section perpendicular to the circumference direction) illustrated in FIG. 2 constantly around the entire circumference thereof, and includes three step seals 5A, 5B, and 5C in this embodiment. Hereinafter, the step seals 5A, 5B, and 5C are each represented by the step seal 5 if not discriminated from one another.

The step seal 5A is provided with a radius-direction wall (step face) 511a facing the upstream side and being along the radius direction R, an axis-direction wall (opposed face) 512a facing the base face 13 (in other words, inner wall face of the casing 10) and being along the axis direction A, and a protrusion 513a formed between the walls 511a and 512a. The radius-direction wall 511a is in the shape of a circular ring entirely having a width in the radius direction R; the axis-direction wall 512a is in the shape of a cylinder entirely having a width in the axis direction A; and the protrusion 513a is in the shape of a circular ring entirely having a width in the radius direction R.

The step seals 5B and 5C are each formed likewise the step seal 5A. Namely, the step seal 5B is provided with a radius-direction wall (step face) 511b facing the upstream side, an axis-direction wall (opposed face) 512b facing the base face 13, and a protrusion 513b formed between the walls 511b and 512b; and the step seal 5C is provided with a radius-direction wall (step face) 511c facing the upstream side, an axis-direction wall (opposed face) 512c facing the base face 13, and a protrusion 513c formed between the walls 511c and 512c.

Hereinafter, the radius-direction walls 511a, 511b, and 511c are each represented by the radius-direction wall 511 if not discriminated from one another; the axis-direction walls 512a, 512b, and 512c are each represented by the axis-direction wall 512 if not discriminated from one another; and the protrusions 513a, 513b, and 513c are each represented by the protrusion 513 if not discriminated from one another.

The sectional shape of the shroud 51 may not be limited to that of the present embodiment and can be appropriately modified. The number of the step seal 5 provided to the shroud 51 is satisfactorily one or more, and is therefore not limited to three.

In contrast, on the inner circumference face of the partition-plate outer ring 11 illustrated in FIG. 2, the annular groove 12 described above is formed. On the base face 13 of the annular groove 12, three seal fins 6A, 6B, and 6C are provided so as to protrude in the radius direction R.

Here, the seal fin 6A disposed at the most upstream side in the flowing direction of the steam S is arranged at a position slightly downstream of the radius-direction wall 511a of the step seal 5A of the shroud 51. Between the tip of the seal fin 6A and the axis-direction wall 512a of the shroud 51, a minute clearance ma is formed in the radius direction R. The seal fin 6B disposed at the second most upstream side among the three seal fins 6 is arranged at a position slightly downstream of the radius-direction wall 511b of the step seal 5B of the shroud 51. Between the tip of the seal fin 6B and the axis-direction wall 512b of the shroud 51, a minute clearance mb is formed in the radius direction R. The seal fin 6C disposed at the most downstream side among the three seal fins 6 is arranged at a position slightly downstream of the radius-direction wall 511c of the step seal 5C of the shroud 51. Between the tip of the seal fin 6C and the axis-direction wall 512c of the shroud 51, a minute clearance mc is formed in the radius direction R. The seal fin 6A, the seal fin 6B, and the seal fin 6C have lengths that comes shorter in this sequence (i.e., the length of the seal fin 6A>the length of the seal fin 6B>the length of the seal fin 6C).

The seal fins 6A, 6B, and 6C are each represented by the seal fin 6 if not discriminated from one another. The minute clearances ma, mb, and mc are each represented by the minute clearance m if not discriminated from one another.

The length, the shape, the installed position, and the number of the seal fin 6 may not be limited to those of the present embodiment, and can be appropriately modified according to, for example, the sectional shapes of the shroud 51 and/or the partition-plate outer ring 11. The dimension of the minute clearance m is preferably set to the minimum within the safe range in which the seal fin 6 and the shroud 51 are not in contact with each other, considering the thermal expansion amounts of the casing 10 and the rotating vanes 50, and the centrifugal elongation amount of the rotating vanes. The sizes of the three minute clearances m are set to the same dimension in the present embodiment, but may alternatively be set to dimensions different from one another according to the requirement.

1-2-2. Step Seal

As described above, the step seal 5 is largely characterized by the presence of the protrusion 513. Description will now be made in relation to the structure of the protrusion with reference to FIGS. 3 and 4.

Figure 3:
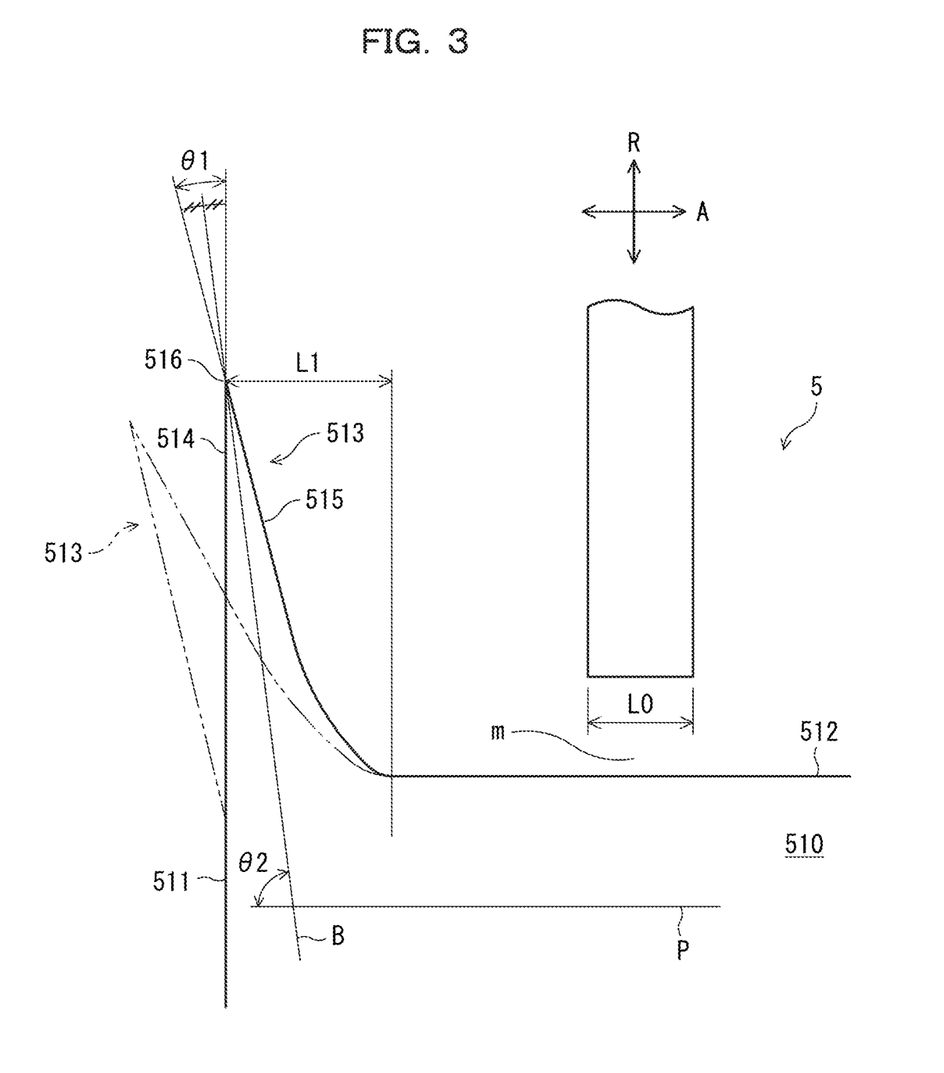
FIG. 3 is a schematic sectional view illustrating the configuration of a step seal according to the first embodiment of the present invention (omitting slant lines representing the section of the step seal).
Figure 4A:
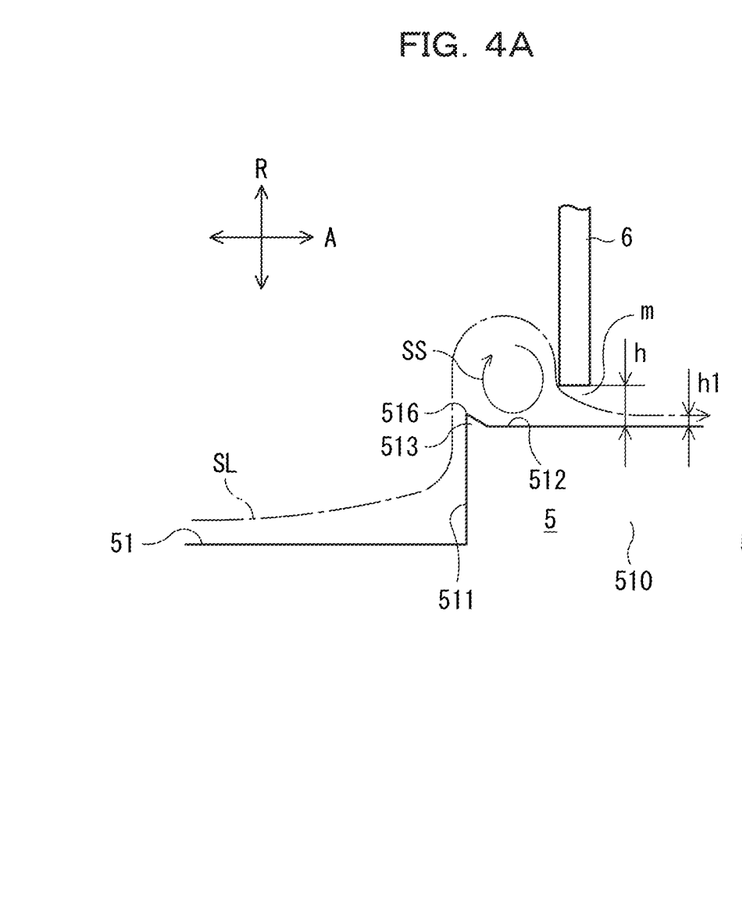
FIG. 4A is a diagram illustrating the step seal according to the first embodiment of the present invention.
Figure 4B:
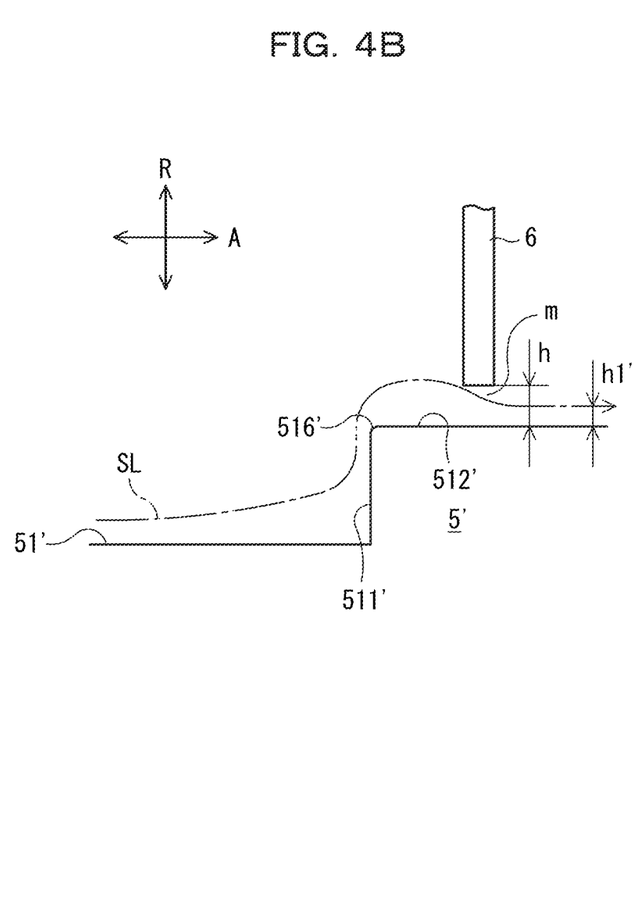
FIG. 4B is a diagram illustrating a traditional step seal (omitting slant lines representing the section of the step seal in both FIGS. 4A and 4B).

As illustrated in FIG. 3, the step seal 5 includes a step seal body 510 having the radius-direction wall 511 and the axis-direction wall 512, and the protrusion 513 formed between the radius-direction wall 511 and the axis-direction wall 512.

A protrusion tip 516 [which is an intersection of a upstream side face (hereinafter the front face) 514 continuous to the radius-direction wall 511 and the downstream face (hereinafter the back face) 515] of the protrusion 513 has a round shape (here, the term "round" means a round shape having at least a radius of curvature that affects a flow of fluid) as it is (without being processed), so that the protrusion tip 516 undergoes a sharpening process. For the above, the protrusion 513 is hereinafter also referred to as the sharp protrusion 513. In other words, the sharp protrusion 513 corresponds to a protrusion having a protrusion tip 516 sharpened by the sharpening process as compared with a tip not being processed.

In the present embodiment, the sharp protrusion 513 is arranged toward the outer circumference side along the radius direction R and the front face 514 thereof is formed to be flush with the radius-direction wall 511 of the step seal body 510. As depicted by the two-dotted line, the sharp protrusion 513 may be inclined with respect to the radius-direction wall 511 (may be inclined with respect to the radius direction R).

As illustrated in FIG. 4B, a traditional step seal 5' of the shroud 51' not having the sharp protrusion 513 is not in the form that provides the leak steam SL with sufficient pressure loss, and additionally has a round corner 516' which let the leak steam SL flow along the one-dotted line. This provides low contraction flow effect. Originally (if the corner 516' is not rounded), the leak steam SL flows in a direction departing from the radius-direction wall 511' to the outer circumference side, so that a separated vortex generates in the leak steam SL near the corner 516' of the step seal 5'. This weakens the flow going into the minute clearance m since the leak steam SL flows in the direction departing from the radius-direction wall 511' to the outer circumference side and provides the contraction flow effect of the separated vortex. The synergistic effect of these would bring leak inhibiting effect of a predetermined level.

However, since the corner 516' is rounded, the leak steam SL flows along the round. Consequently, the leak steam SL only slightly departs toward the outer circumference side as indicated by an arrow of the one-dotted line and flows into the minute clearance m, while keeping the force directing to the downstream side not sufficiently weakened.

Furthermore, since a sufficient space to form the separated vortex (see the separated vortex SS in FIG. 4A) is not formed between the flow of the leak steam SL and the opposed wall 512', the separated vortex does not sufficiently grow. If the separated vortex sufficiently grows, the separated vortex generates a downward high-velocity flow in FIG. 4B and the contraction flow effect can be obtained. However, since the separated vortex does not sufficiently grow, the contraction flow effect is not obtained. This means that the effective height h1' of the flow of the leak steam SL is relatively high and the contraction flow effect (=h1'/h) represented by the ratio of the effective length h1' to the gap dimension h between the seal fin 6 and the step seal 5' is not sufficient.

In particular, as described in "Problems to be Solved by Invention", in cases where the height of the step seal is not ensured and/or the positional relationship between the seal fin 6 and the step seal 5' is deviated from the designed or the optimum point, due to thermal expansion of the shroud 51' in the axis direction A, the contraction flow effect becomes low.

In contrast to the above, since the leak steam SL flows as indicated by the arrow of the one-dotted line in the shroud 51 of the first embodiment of FIG. 4A, the effective height h1 of the flow of the leak steam SL is lower than the effective height h' when the traditional shroud 51' is used and the contraction flow effect (=h1/h) represented by the ratio of the effective length h1 to the gap dimension h between the seal fin 6 and the shroud 51 is improved as compared with the contraction flow effect (=h1'/h) of the case using the conventional shroud 51' [(h1/h)<(h1'/h)].

This is due to the presence of the sharp protrusion 513 protruding toward the outer circumference side in the radius direction R, which sufficiently weakens the force directing downstream by increasing the flowing resistance against the leak steam SL and also by proactively guiding the leak steam SL toward the outer circumference side as depicted in the one-dotted line in FIG. 4A, and which also provides the contraction flow effect by inducing generation of the separated vortex that causes, at the upstream side of the minute clearance m, high-velocity downward flow in FIG. 4A. In other words, since the leak steam SL largely detour before flowing into the minute clearance m between the seal fin 6 and the shroud 51, a space wider than that in a traditional structure is formed between the flow of the leak steam SL and the axis-direction wall 512, which enhances the growth of the separating vortex, and the enhanced separated vortex SS provides high contraction flow effect.

In addition to the above, since the sharp protrusion 513 of the step seal 5 has the sharp-shaped protrusion tip 516, the leak-suppressing effect is not degraded in contrast to the rounded protrusion tip 516' of the step seal 5' of the traditional shroud 51'.

Here, preferable range of the principal dimensions L1, θ1, and θ2 of the sharp protrusion 513 will now be described with reference to FIGS. 3 and 5.

Figure 5:
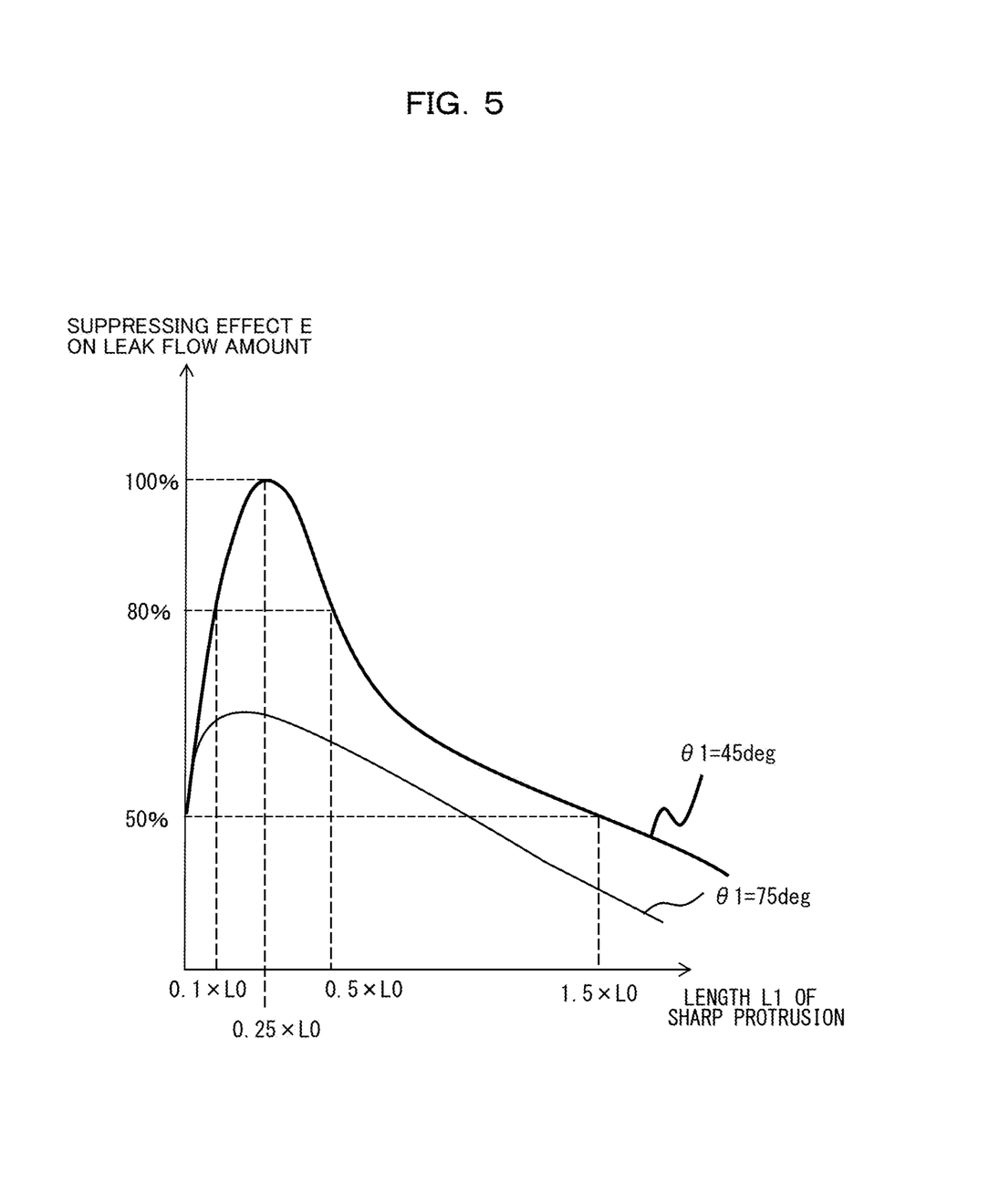
FIG. 5 is a schematic diagram illustrating a setting range of a main dimension of the step seal according to the first embodiment of the present invention, specifically illustrating a result of analyzing the correlation among the suppressing effect E on leak flow amount, the length L1 of a sharp protrusion along the axis direction A, and the angle θ1 of the sharp protrusion.

FIG. 5 is a diagram illustrating a result of analyzing the correlation among the suppressing effect E on leak flow amount, the length L1 of the sharp protrusion 513 along the axis direction A, and the angle θ1 of the sharp protrusion (the angle defined by the front face 514 and the back face 515). The suppressing effect E represents a reducing amount of leak, assuming that 100% corresponds to the maximum reducing amount of leak obtained when the angle θ1 is 45 degrees, the length L1 of the sharp protrusion 513 is 0.25 times the length L0 of the seal fin 6 along the axis-direction.

An excessively long length L1 of the sharp protrusion 513 causes the point (separating point) where the leak steam SL separates from the sharp protrusion 513 to be far distant from the seal fin 6 to the upstream side, so that the separated vortex SS is weakened (affect on the leak steam SL about to pass through the seal fin 6 is weakened) and the length L1 establishes the relationship to the suppressing effect on a leak flow amount as illustrated in FIG. 5.

FIG. 5 indicates that the length L1 of the sharp protrusion 513 is preferably at most 1.5 times the length L0 of the seal fin 6 along the axis direction A (L1≤1.5×L0) for obtaining the suppressing effect E of 50% or more, more preferably, at least 0.1 times and at most 0.5 times the length L0 (0.1×L0≤L1≤0.5×L0) for obtaining the suppressing effect E of 80% or more.

The angle θ1 of the sharp protrusion 513 contributes to fixing the separating point of the leak stream SL and the traveling direction of the leak steam SL at the separating point. An excessively large 81 causes the leak steam SL to revolve around the sharp protrusion 513, which consequently makes the sharp protrusion 513 fail to function as a corner (protrusion) to fix the separating point. This causes the leak steam SL to flow along the sharp protrusion 513, so that the separated vortex generates a weak contracted flow.

In other words, the sharp protrusion 513 preferably has a small angle θ1 and is preferably thin. An angle θ1 of 75 degrees or less allows the sharp protrusion 513 to satisfactorily function as the fixing point of the separating point; and an angle θ1 of 45 degrees or less enhances the sharpness of the tip and enables precise control of the traveling direction of the leak steam SL at the separating point. Accordingly, the angle θ1 is preferably 75 degrees or less (θ1≤75), more preferably 45 degrees or less (θ1≤45).

The angle θ2 of FIG. 3 represents the tilt angle of the sharp protrusion 513, and corresponds to an intersection angle of the bisectors B that bisects the angle θ1 of the sharp protrusion 513 and the parallel line P of the axis-direction wall 512 (i.e., an intersection angle of the bisectors B and the axis-direction wall 512).

Here, focusing on the intersection angle on the left side of the intersection point of the bisector B and the parallel line P, the intersection angle where the bisector B comes lower than the parallel line P is referred to as negative (minus) and the intersection angle where the bisector B comes higher than the parallel line P is referred to as positive (plus). Accordingly, in the example of FIG. 3, the tilt angle θ2 of the sharp protrusion 513 is positive.

Likewise the angle θ1, the tilt angle θ2 contributes to fixing the separating point of the leak stream SL and the traveling direction of the leak steam SL at the separating point. If the tilt angle θ2 is less than −30 degrees, the sharp protrusion 513 excessively directs in the direction of resisting the flow of the leak steam SL, so that the flow direction of the leak steam SL at the protrusion tip 516, i.e., the separating point, excessively directs to the minute clearance m and consequently strong contracted flow is not generated. Likewise, if the angle θ2 is larger than 150 degrees, the flow direction of the leak steam SL excessively directs to the minute clearance m and consequently strong contracted flow is not generated.

For the above, the preferable range of the angle θ2 is −30 degrees or more and 150 degrees or less (−30≤θ2≤150).

The result of analysis shown in FIG. 5 assumes that the tilt angle θ2 of the sharp protrusion 513 is 75 degrees.

1-3. Method for Manufacturing a Step Seal

Description will now be made in relation to the method for manufacturing a step seal according to the first embodiment with reference to FIGS. 6A, 6B, and 6C. The method carries out, in sequence, a cutting step illustrated in FIG. 6A, a grinding step illustrated in FIG. 6B, and completes the process of a step 5 as shown in FIG. 6C, to complete the manufacturing of the step seal 5.

Figure 6A:
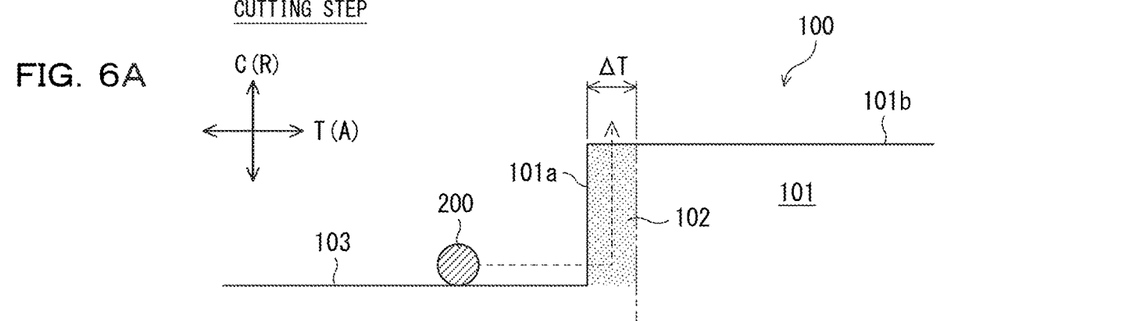
FIG. 6A is a diagram illustrating a cutting step.

In the cutting step illustrated in FIG. 6A, a prospective cut portion 102 (a dotted portion in FIG. 6A) being disposed at the step section 101 of a raw material (a step seal raw material) 100 is cut with the cutting knife 200 of a cutting device. The step section 101 includes a step face 101a and an opposed face 101b that crosses the step face 101a. The prospective cut portion 102 is set to a predetermined range (a predetermined thickness ΔT from the step face 101a) in the thickness direction T (the direction that coincides with the axis direction A when the step seal is mounted to the steam turbine 1) from the step face (one of a first face and a second face) 101a. In other words, the dimension of the step section 101 of the raw material 100 is set in consideration of the thickness ΔT of the prospective cut portion 102 with respect to the product (i.e., the step seal 5).

Specifically, the cutting knife 200 is propelled in the direction of the broken-line arrow, that is, the cutting knife 200 is first propelled along the thickness direction T until the cutting knife 200 digs into the boundary between the step face 101a and the opposed face 103, and then propelled along the cutting direction C (the direction that extends along the radius direction R when the step seal is mounted on the steam turbine 1) that crosses the thickness direction T so as to be departing from the opposed face 103 to cut off the prospective cut portion 102. When the cutting proceeds to make the residue of the prospective cut portion 102 small, the residue bends toward the cutting direction C, coming not to endure the propelling force of the cutting knife 200, and is consequently formed into the protrusion 102' (i.e., remains in the form of a flush), so that the shroud raw material 100 comes to be an intermediate product 100'. The cutting process may be substituted with electrical discharge machining.

In the grinding step of FIG. 6B, the face (hereinafter referred to as an unprocessed face) 105 of the protrusion 102' on the opposite side of the cut face 104 is not processed yet and is then ground by the grinder 201. Consequently, as illustrated in FIG. 6C, the protrusion 102' is formed into the sharp protrusion 513 having a sharp tip and the manufacturing of the step seal 5 is completed.

The angle θ1 (see FIG. 3) of the sharp protrusion 513 can be adjusted according to the amount of grinding and the angle of grinding. The tilt angle θ2 (see FIG. 3) of the sharp protrusion 513 can be adjusted by the thrust force that the grinder 201 applies to the protrusion 102' when the grinder 201 grinds the protrusion 102' to form the sharp protrusion 513. The method of manufacturing may further include a processing step of adjusting the tilt angle θ2 of the sharp protrusion 513 by, for example, bending separately from the grinding step.

1-4. Advantages

The step seal, the seal structure, the steam turbine, and the method for manufacturing a shroud according to the first embodiment of the present invention have the following advantages.

Being guided by the protrusion 513 formed on the step seal 5, the leak steam SL directing to the minute clearance m is deviated toward the outer circumference side, so that weakening the flow of the leak steam SL toward the minute clearance m and growth of the separated vortex (i.e., improvement in contraction flow effect) at the upstream of the minute clearance m are promoted. Accordingly, even in cases where the height of the step seal is not ensured and/or the positional relationship between the seal fin 6 and the step seal 5 is deviated from the designed point due to thermal expansion of the shroud 51 in the axis direction A, these inconveniences can be canceled to ensure high leak-suppressing effect.

Since the protrusion 513 is formed to be a sharp protrusion having a sharp tip, it is possible to avoid degrading of the leak-suppressing effect caused by the protrusion 513 having the rounded tip.

Further, setting the length L1, the angle θ1, and the tilt angle θ2, which are the principal dimensions of the sharp protrusion 513, to respective appropriate ranges ensures higher leak-suppressing effect.

Using such a step seal 5 having a high leak-suppressing effect suppresses the leak loss of the steam turbine 1 and ensures high turbine efficiency.

It is conceivable that an inclination is formed at the corner of the step seal 5 through a bending process and the leak flow is guided along the inclination likewise the protrusion 513, or the protrusion 513 is formed by casting to have a protrusion at first hand. The present invention provides the protrusion 513 using the generation of a flush accompanied by the cutting process, so that the protrusion can be formed inexpensively.

2. Second Embodiment

The present embodiment is different from the first embodiment only in the configuration of the step seal, so description will now be made in relation only to the configuration of the step seal.

2-1. Step Seal

Figure 7:
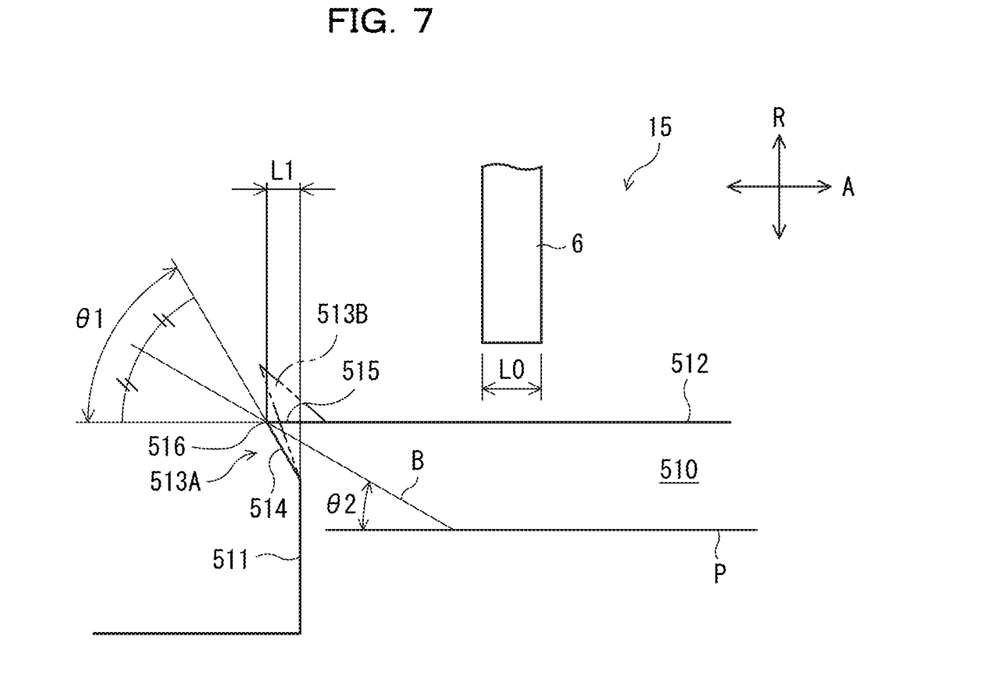
FIG. 7 is a schematic sectional view illustrating the configuration of a step seal according to a second embodiment of the present invention (omitting slant lines representing the section of the step seal).

The present embodiment includes a step seal 15 shown in FIG. 7, which is substituted in place of the step seals 5A, 5B, and 5C included in the shroud 51 of FIG. 2.

As illustrated in FIG. 7, the step seal 15 includes a step seal body 510 having a radius-direction wall 511 and an axis-direction wall 512, and a sharp protrusion 513A formed between the radius-direction wall 511 and the axis-direction wall 512 of the step seal body 510.

The protrusion 513A has a protrusion tip 516 being defined by the intersection of an upstream face (hereinafter referred to as front face) 514 continuous to the radius-direction wall 511 of the step seal body 510 and a face (hereinafter referred to as back face) 515 facing the base face 13 (see FIG. 2) on the casing 10 and being shaped into a sharp tip without a round portion. For the above, the protrusion 513A is hereinafter referred to as the sharp protrusion 513A. In other words, the sharp protrusion 513A corresponds to a protrusion having a protrusion tip sharpened by a sharpening process as compared with a tip not being processed.

In the present embodiment, the sharp protrusion 513A extends to the upstream side along the axis direction A and the back face 515 of the sharp protrusion 513A is formed to be flush with the axis-direction wall 512 of the step seal body 510.

The preferable ranges of the length L1, the angle θ1, and the tilt angle θ2, which are the principal dimensions of the sharp protrusion 513A, are the same as those of the first embodiment. Specifically, the length L1 is preferably 1.5 times the length L0 of the seal fin 6 in the axis direction 6 or less (L1≤1.5×L0), and is more preferably at least 0.1 times and at most 0.5 times the length L0 (0.1×L0≤L1≤0.5×L0); the angle θ1 of the sharp protrusion 513A is preferably 75 degrees or less (θ1≤75), and is more preferably 45 degrees of less (θ1≤45); and the tilt angle of θ2 of the sharp protrusion 513A is preferably −30 degrees or more and 150 degrees or less.

Figure 8:
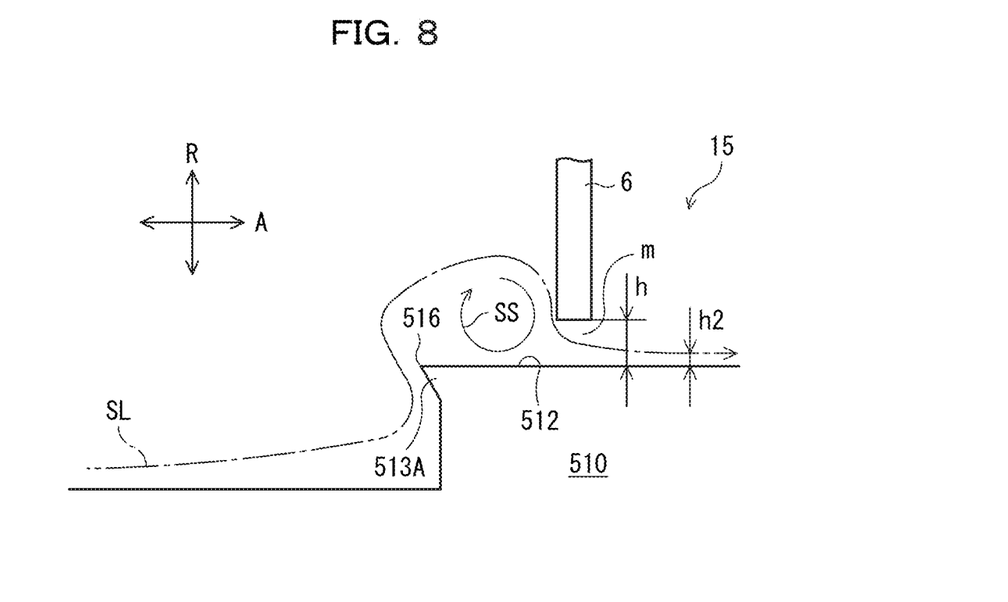
FIG. 8 is a schematic sectional view for describing an action of the step seal according to the second embodiment of the present invention (omitting slant lines representing the section of the step seal).

As illustrated by the one-dotted line of FIG. 8, because of the sharp protrusion 513A protruding toward the upstream side, the leak steam SL receives large flowing resistance and is additionally guided to the upstream side (opposite direction to the minute clearance m). Consequently, the flow of the leak steam SL directing to the minute clearance m is more weakened by the sharp protrusion 513A than by the sharp protrusion 513 of the first embodiment, which protrudes toward the outer circumference side. Furthermore, since the leak steam SL more largely detour before flowing into the minute clearance m compared with the first embodiment, a further wider space is formed between the flow of the leak steam SL and the axis-direction wall 512 and the wider space enhances the growth of the separated vortex SS, high contraction flow effect can be obtained by the enhanced separated vortex SS. Accordingly, leak-suppressing effect higher than that of the first embodiment can be obtained.

As a result, likewise the step seal 5 of the first embodiment, the step seal 15 of the second embodiment of the present invention can further reduce the leak amount compared to the traditional step seal 5' illustrated in FIG. 4B. In other words, the effective height h2 of the flow of the leak steam SL is lower than the effective height h1' when the conventional step seal 5' is used and the contraction flow effect (=h2/h) represented by the ratio of the effective length h2 to the gap dimension h between the seal fin 6 and the axis-direction wall 512 is improved as compared with the contraction flow effect (=h1'/h) when the traditional step seal 5' is used [(h2/h)<(h1'/h)].

In addition to the above, the sharp protrusion 513A of the step seal 5A, which has the protrusion tip 516 in the form of a sharp protrusion likewise the sharp protrusion 513 of the first embodiment, does not degrade the leak-suppressing effect.

2-2. Method for Manufacturing a Step Seal

Description will now be made in relation to the method for manufacturing a step seal according to the second embodiment with reference to FIGS. 9A, 9B, and 9C. The method for manufacturing a step seal carries out, in sequence, a cutting step illustrated in FIG. 9A, a grinding step illustrated in FIG. 9B, to complete the manufacturing of the step seal 15 as shown in FIG. 9C.

Figure 9A:
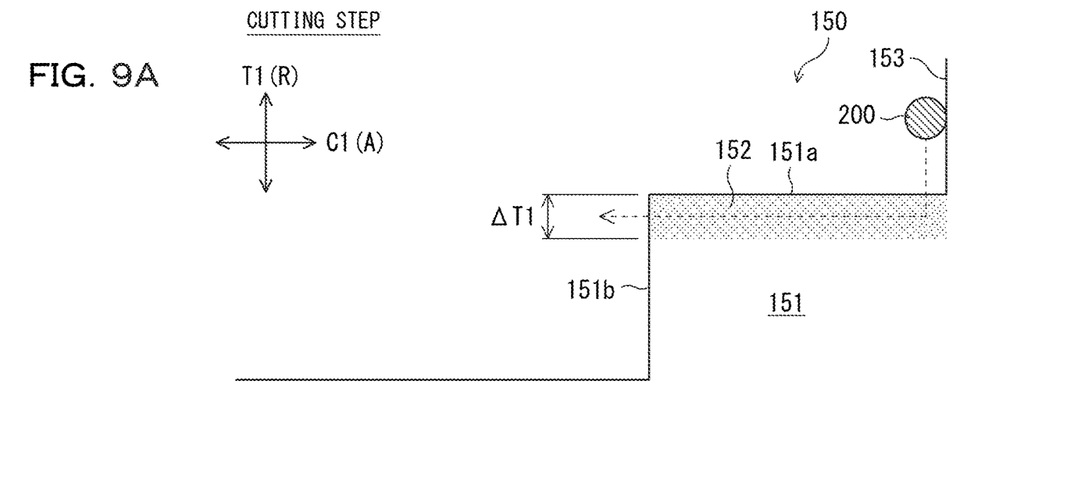
FIG. 9A is a diagram illustrating a cutting step.

In the cutting step illustrated in FIG. 9A, a prospective cut portion 152 (a dotted portion in FIG. 9A) being disposed at the step section 151 of a raw material 150 is cut with the cutting knife 200 of a cutting device. The step section 151 includes a step face 151b and an opposed face 151a that crosses the step face 151b. The prospective cut portion 152 is set to a predetermined range (a predetermined thickness ΔT1 from the step face 151a) in the thickness direction T1 (the direction that coincides with the axis direction A when the step seal is mounted to the steam turbine 1) from the step face (one of a first face and a second face) 151a. In other words, the dimension of the step section 151 of the raw material 150 is set in consideration of the thickness ΔT1 of the prospective cut portion 152 with respect to the product of the step seal 15.

For this purpose, the cutting knife 200 is propelled in the direction of the broken-line arrow, that is, the cutting knife 200 is first propelled along the thickness direction T1 toward the step section 151 until the cutting knife 200 digs into the boundary between the step face 151a and the opposed face 153, and then propelled along the cutting direction C1 (along the axis direction A when the step seal is mounted on the steam turbine 1) that crosses the thickness direction T1 so as to be departing from the opposed face 153 to cut off the prospective cut portion 152. When the cutting proceeds to make the residue of the prospective cut portion 152 small, the residue bends toward the cutting direction C1, coming not to endure the propelling force of the cutting knife 200, and is consequently formed into the protrusion 152' (i.e., remains in the form of a flush), so that the raw material 150 comes to be an intermediate product 150'. The cutting process may be substituted with electrical discharge machining.

In the grinding step illustrated in FIG. 9B, the face (hereinafter referred to as unprocessed face) 155 of the protrusion 152' on the opposite side of the cut face 154 is not processed yet and is then ground by the grinder 201. Consequently, as illustrated in FIG. 9C, the protrusion 152' is formed into the sharp protrusion 513A having a sharp tip and the manufacturing of the step seal 15 is completed.

The angle θ1 (see FIG. 7) of the sharp protrusion 513A can be adjusted according to the amount of grinding and the angle of grinding. The tilt angle θ2 (see FIG. 7) of the sharp protrusion 513A can be adjusted by the thrust force that the grinder 201 applies to the protrusion 152' when the grinder 201 grinds the protrusion 152' to form the sharp protrusion 513A. The method may further include a processing step of adjusting the tilt angle of the sharp protrusion 513A through, for example, a bending process separately from the grinding step.

Figure 9B:
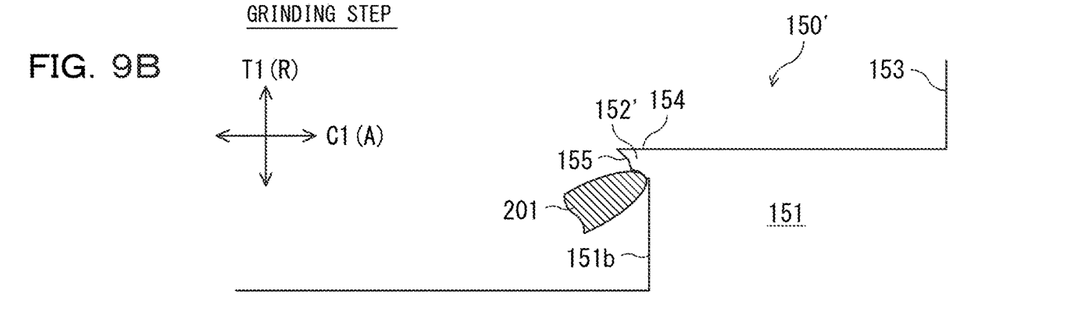
FIG. 9B is a diagram illustrating a grinding step.
Figure 9C:
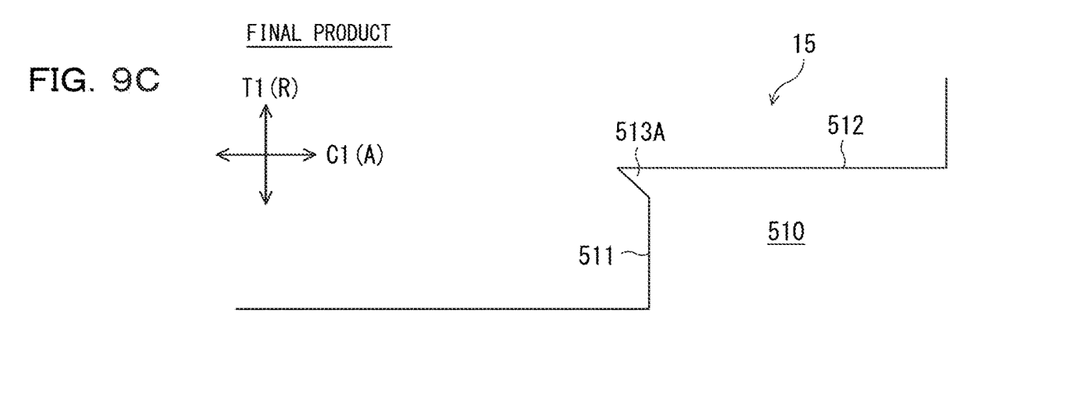
FIG. 9C is a diagram illustrating a state where the product is completely manufactured after the grinding step (omitting slant lines representing the section of the step seal in FIGS. 9A, 9B, and 9C).

The method for manufacturing a step seal according to the present embodiment should by no means be limited to that described in above FIGS. 9A-9B.

Figure 6B:
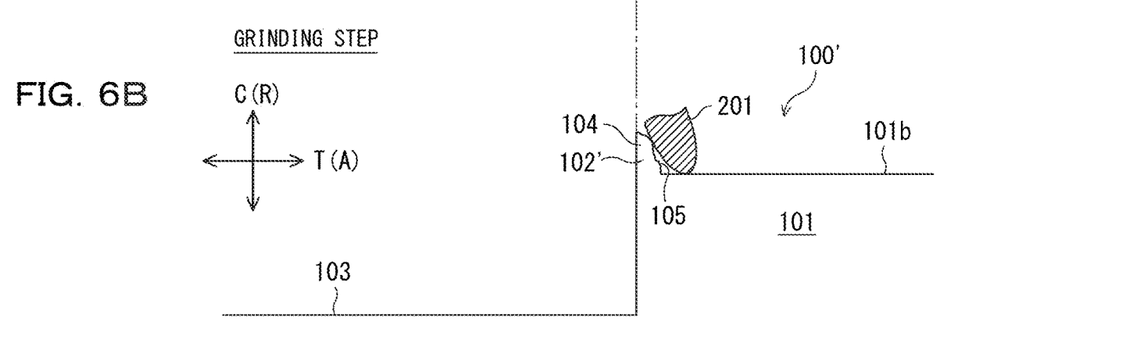
FIG. 6B is a diagram illustrating a grinding step.
Figure 6C:
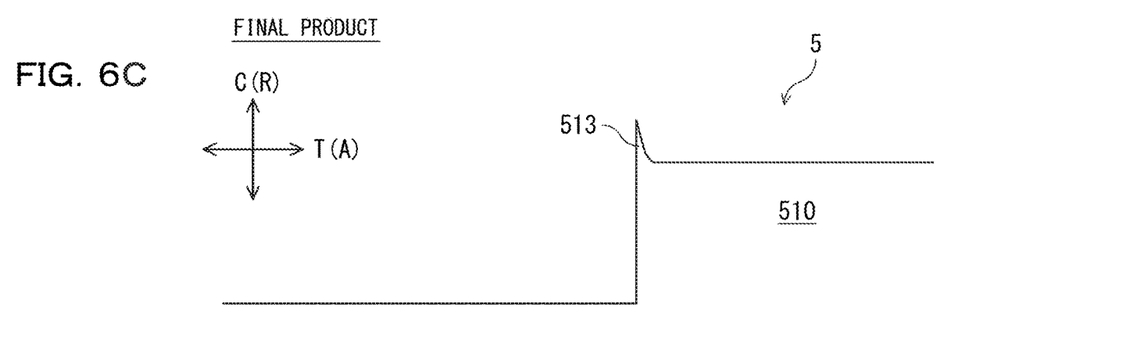
FIG. 6C is a diagram illustrating a state where the product is completely manufactured after the grinding step (omitting slant lines representing the section of the step seal in FIGS. 6A, 6B, and 6C).

Alternatively, the step seal 15 of the second embodiment shown in FIG. 7 can be manufactured by cutting the prospective cut portion 102 of the step face 101a as shown in FIG. 6A and then grinding the unprocessed face 105 as shown in FIG. 6B as carried out in the first embodiment; and during the grinding, grinding the protrusion 102' with the grinder 201 and pushing over the protrusion 102' such that the protrusion 102' comes to be parallel with the opposed face 103.

2-3. Advantages

According to the step seal, the seal structure, and the steam turbine of the second embodiment, the sharp protrusion 513A directing upstream (i.e., the opposite direction to the minute clearance m) can apply larger flowing resistance to the leak steam SL compared with the first embodiment, in which the sharp protrusion 513 directs toward the outer circumference side, and can also enhance the separated flow, so that the second embodiment can obtain leak-suppressing effect and turbine efficiency each higher than those of the first embodiment.

The method for manufacturing a step seal according to the second embodiment of the present invention is carried out as the above and therefore can obtain the effects same as those that the method for manufacturing a step seal of the first embodiment obtains.

3. Miscellaneous (1) In the above embodiments, the shroud 51 and the casing 10 are regarded as the first structure and the second structure of the present invention, respectively, the step seals 5, 15 are formed on the shroud 51, and the seal fins 6 are formed on the casing 10. In contrast to the above, the casing 10 and the shroud 51 may be regarded as the first structure and the second structure of the present invention, respectively. This means that the step seals 5, 15 may be formed on the casing 10 and the seal fins 6 may be formed on the shroud 51.

(2) In the above embodiments, the seal structure of the present invention is applied to the seal structure between the casing 10 and the rotating vanes 50, but alternatively may be applied to the seal structure between the shaft main body 31 and the stationary vanes 40.

(3) In the first embodiment, all the step seals 5A, 5B, and 5C formed in the shroud are provided with the sharp protrusions 513, and in the second embodiment, all the step seals 5A, 5B, and 5C formed in the shroud are provided with the sharp protrusions 513A. Alternatively, a sharp protrusion 513 or 513A may be satisfactorily provided to at least one of the step seals 5A, 5B, and 5C. Further alternatively, a step seal with the sharp protrusion 513 and a step seal with the sharp protrusion 513A may be mixedly included in a single shroud.

(4) In the above embodiments, each of the protrusion 513, 513A is ground in the grinding step so as to be formed into the sharp protrusion with a sharp tip. Alternatively, the grinding step may be omitted. In other words, the intermediate product 100' before being ground shown in FIG. 6B and the intermediate product 150' before being ground shown in FIG. 9B may be used as product shrouds having protrusions 102' and 152' in the seal structure and the turbo machine of the present invention. Even not being formed to be sharp, the protrusions 102' and 152' can guide the leak steam SL upstream, so that the leak-suppressing effect can be obtained by canceling the effects caused by the rounded tip.

(4) The shape of and process for the sharp protrusion are not limited those of the foregoing embodiments. For example, the sharp protrusion may be the sharp protrusion 513B as shown by the two-dotted line in FIG. 7.

(5) The above embodiments describe an example that the present invention is applied to a steam turbine. Alternatively, the present invention can be applied to the seal of a turbo machine, i.e., a gas turbine or a turbo compressor, except for a steam turbine. Furthermore, the present invention can be applied to a seal between two structures that relatively rotate in a machine (such as a rotary joint) except for the turbo machine.

EXPLANATION OF REFERENCE SIGNS

1: steam turbine (turbo machine)
2: seal structure
5,5A,5B,5C,15: step seal
6,6A,6B,6C: seal fin
10: casing (first structure or second structure)
11: partition-plate outer ring
12: annular groove
13: base face
15: step seal
30: rotating shaft
31: shaft main body
40: stationary vane
50: rotating vane
51: shroud (first structure or second structure)
100: raw material (step seal raw material)
100': intermediate product
101: step portion
101a: step face (either one of first face and second face)
101b: opposed face 102: prospective cut portion
102': protrusion (flush)
101b: opposed face
104: cut face
105: unprocessed face
150: raw material (step seal raw material)
150': intermediate product
151: step portion
151a: opposed face
151b: step face
152: prospective cut portion
152': protrusion (flush)
153: step face
154: cut face
155: unprocessed face
200: cutting knife
201: grinder
510: step seal body
511,511a,511b,511c: radius-direction wall (step face) of step seal 5
512,512a,512b,512c: axis-direction wall (step face) of step seal 5
513,513a,513b,513c: sharp protrusion of step seal 5
513A,513B: sharp protrusion of step seal 15
514: front face of sharp protrusion 513
515: back face of sharp protrusion 513
516: protrusion tip
A: axis direction
B: bisector of angle θ1
C: cutting direction
CL: axis line
Gd: gap
h: gap size between seal fin 6 and shroud 51
h1,h1': effective height of leak steam SL
L0: length of fin body 61 along axis direction A
L1: length of sharp protrusion 513 along axis direction A
m,ma,mb,mc: minute clearance (clearance)
R: radius direction
S: steam (fluid)
SL: leak steam
SS: separated vortex
T,T1: thickness direction
ΔT: thickness of prospective cut portion 102
ΔT1: thickness of prospective cut portion 152
θ1: angle of sharp protrusion 513
θ2: tilt angle of sharp protrusion 513

What is claimed is:

1. A step seal that suppresses leak of a fluid from a gap between a first structure and a second structure and that is formed on the first structure so as to have a clearance between the step seal and a seal fin formed on the second structure, the first structure and the second structure facing each other in a radius direction with the gap inbetween and rotating around an axis line relative to each other, the step seal comprising:
   a step seal body comprising a step face facing an upstream side of a flow direction of the fluid and an opposed face facing the second structure; and
   a protrusion formed between the step face and the opposed face, wherein
   a length of the protrusion along the axis line is at least 0.1 times and at most 0.5 times a length of the seal fin along the axis line.

2. The step seal according to claim 1, wherein
the protrusion is a sharp protrusion having a sharp tip.
3. The step seal according to claim 2, wherein
an angle of the protrusion is 75 degrees or less, and a tilt angle of the protrusion is set in a range of −30 degrees or more and 150 degrees or less.
4. The step seal according to claim 3, wherein
the protrusion protrudes toward the upstream side.
5. The step seal according to claim 2, wherein
the protrusion protrudes toward the second structure.
6. The step seal according to claim 5, wherein
the protrusion protrudes toward the upstream side.
7. The step seal according to claim 2, wherein
the protrusion protrudes toward the upstream side.
8. The step seal according to claim 1, wherein
an angle of the protrusion is 75 degrees or less, and a tilt angle of the protrusion is set in a range of −30 degrees or more and 150 degrees or less.
9. The step seal according to claim 8, wherein
the protrusion protrudes toward the second structure.
10. The step seal according to claim 9, wherein
the protrusion protrudes toward the upstream side.
11. The step seal according to claim 8, wherein
the protrusion protrudes toward the upstream side.
12. The step seal according to claim 1, wherein
the protrusion protrudes toward the second structure.
13. The step seal according to claim 12, wherein
the protrusion protrudes toward the upstream side.
14. The step seal according to claim 1, wherein
the protrusion protrudes toward the upstream side.
15. A seal structure that suppresses leak of a fluid from a gap between a first structure and a second structure facing each other in a radius direction with the gap inbetween and rotating around an axis line relative to each other, the seal structure comprising:
   a step seal defined in claim 1, the step seal being formed on the first structure; and
   a seal fin that extends toward the opposed face of the step seal at a downstream side of the flow direction of the fluid with respect to the step face of the step seal and that is formed on the second structure so as to have a clearance between the seal fin and the opposed face.
16. A turbo machine comprising the seal structure defined in claim 15.
17. A method for manufacturing a step seal in a step structure that suppresses leak of a fluid from a gap between a first structure and a second structure, the step seal being formed on the first structure so as to have a clearance between the step seal and a seal fin formed on the second structure, the first structure and the second structure facing each other with the gap inbetween and rotating around an axis line relative to each other, the method comprising:
   a cutting step of setting, in a step seal raw material comprising a first face and a second face crossing the first face, a predetermined range from a surface of one of the first face and the second face in a thickness direction to be a prospective cut portion and by cutting the prospective cut portion in a cutting direction that crosses the thickness direction, forming a protrusion protruding toward the cutting direction.
18. The method according to claim 17, further comprising:
   a grinding step of grinding the protrusion into a sharp protrusion having a sharp tip.

* * * * *